Figure 1:
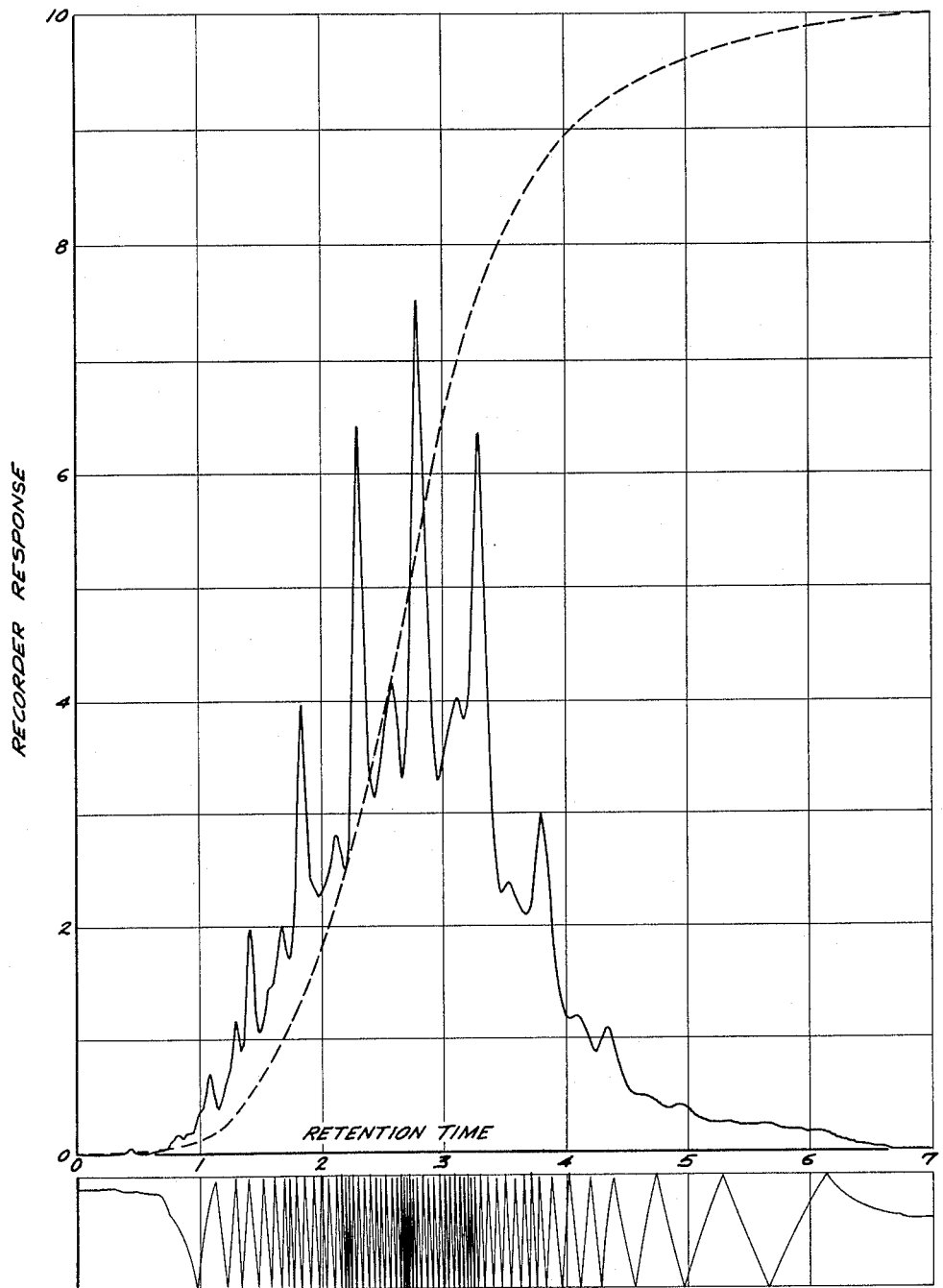

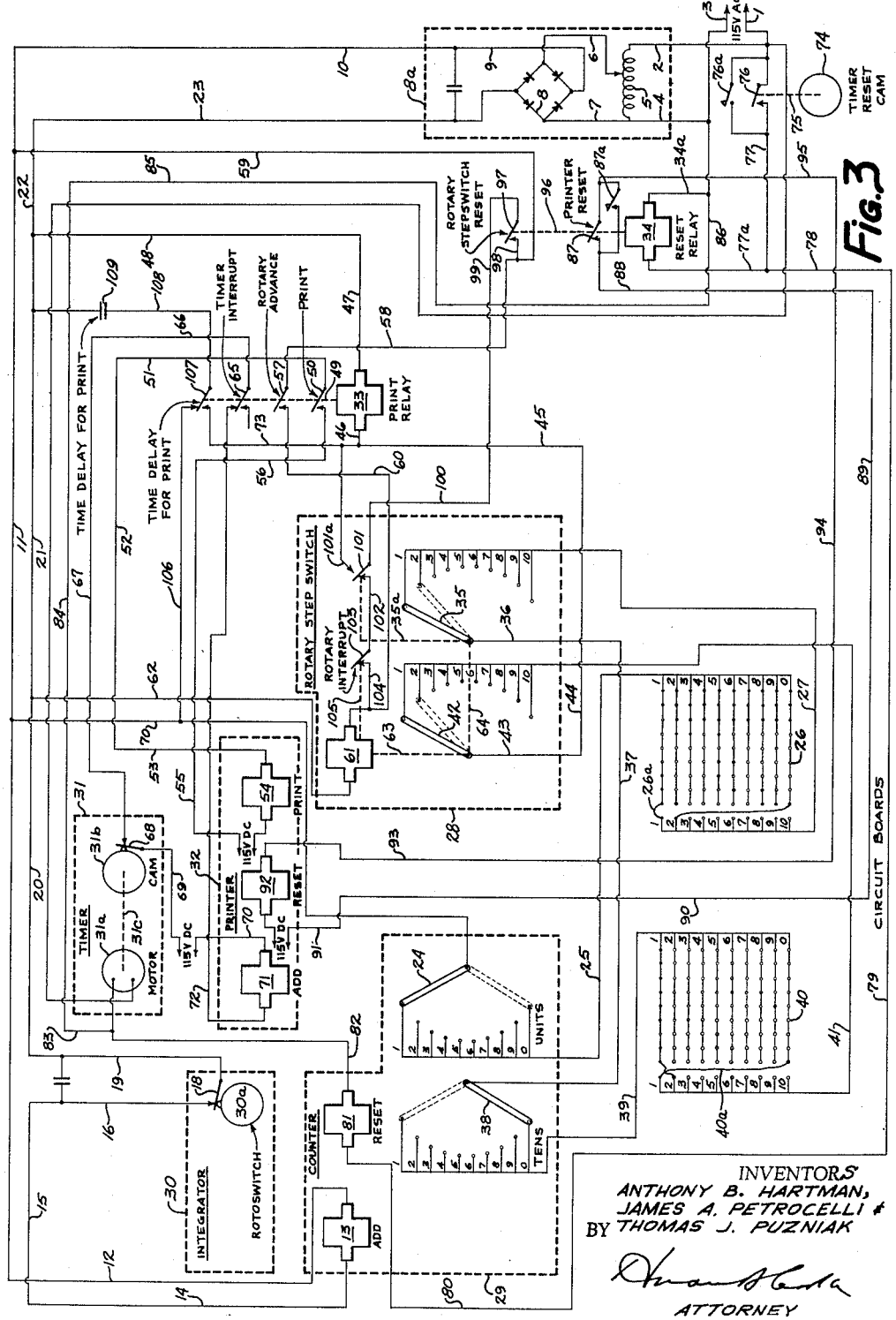

3,183,515
RECORDING APPARATUS
Anthony B. Hartman, Verona, James A. Petrocelli, North Versailles Township, Allegheny County, and Thomas J. Puzniak, Cheswick, Pa., assignors to Gulf Research & Development Company, Pittsburgh, Pa., a corporation of Delaware
Filed Apr. 22, 1963, Ser. No. 274,728
17 Claims. (Cl. 346—34)

This invention relates to a device for automatic recording of values that are a function of one variable at times when other predetermined values are attained that are functions of another variable, and especially to a device for automatic recording of values that are a function of time at predetermined values that are a function of an integral change with respect to time. In a particular instance, the invention relates to a device for automatic recording of values that are functions of the retention times of components undergoing separation in a chromatographic separating column, at predetermined values that are functions of the integral change with respect to time of the composition of the effluent from the chromatographic separating column.

In copending application Serial No. 178,012 filed March 7, 1962, in the names of Burow, Clark, Lichtenfels and Petrocelli, assigned to the assignee of all rights hereunder, there is disclosed automatic temperature-programmed apparatus for analyzing fluid mixtures having a relatively wide boiling range by gas chromatography. The apparatus so disclosed takes advantage of the fact that the column retention times for the components of a fluid mixture separated in a chromatographic column are a function of the boiling points of these components, and that the percent yield from the column is related to the integral change in detector signal strength with respect to time. More particularly, the apparatus disclosed in the aforesaid copending application takes advantage of the fact that the relation between the retention times for the components of a mixture separated in the column and the boiling points of these components is essentially linear when a temperature-programmed chromatographic column is used in the separation of the mixture, and when the rate of temperature rise is substantially linear. As disclosed, the apparatus of the copending application may record the desired distillation data in terms of a curve indicative of the integral of the differential change of composition of the column effluent with respect to retention time in the column. However, in order to convert the recorded data into a form useful for purposes of ASTM petroleum distillation tests, it has been necessary at the least to convert the values on the retention time scale to temperatures (in accordance with the aforementioned correlation), and also to normalize the integral curve, at least in instances when this has not already been achieved by adjustment of the sensitivity of the detection and/or recording instrument. Finally, it has been necessary to interpret the desired values from the thus-obtained curve. While such conversion, normalization and interpretation are entirely practical and, when taken with the fully automatic operation of the disclosed analytical apparatus, very advantageous as compared with previous laboratory or manually-operated instrument analytical procedures, the direct recording of the information desired from the curve in a more readily usable form would facilitate the analytical determinations in question from the standpoint of operator time, and would reduce the possibility of error.

The present invention therefore relates to apparatus for automatically recording analytical information obtained by gas chromatography in a more directly useful form, and more particularly to apparatus for automatically recording values that are a function of a variable, such as time, at times when certain other predetermined values are attained that are functions of another variable, such as an integral change with respect to a variable such as time. Broadly speaking, the apparatus of this invention includes, among other elements, a primary means for obtaining a primary, digitalized output that is a function of a first variable, such as an integral change with respect to time. Means actuated by said primary means are also included for counting the primary digitalized integral output pulses. There are further included secondary means furnishing a secondary digitalized output that is a function of a second variable, e.g., time. Means are further provided for counting the secondary digitalized output pulses. The apparatus further includes printing means operatively associated with said secondary pulse counting means, for printing a number that is a function of said secondary variable, and actuating means, actuated by said primary pulse counting means when a predetermined number of primary digitalized output pulses has been reached, for actuating said printing means. The invention includes not only the above-indicated apparatus in subcombination form, but also the combination thereof with chromatographic analytic apparatus including a chromatographic separating column for separating a fluid mixture, detecting means for detecting the separated components of the fluid mixture as they emerge from the separating column, said detecting means having an output that is a function of the composition of the effluent from the separating column, and means for converting the output of the detecting means to an output that is a function of the integral of the differential change in composition of the effluent from said column, with respect to time. The present invention also includes novel subcombinations of the foregoing apparatus.

Figure 2:
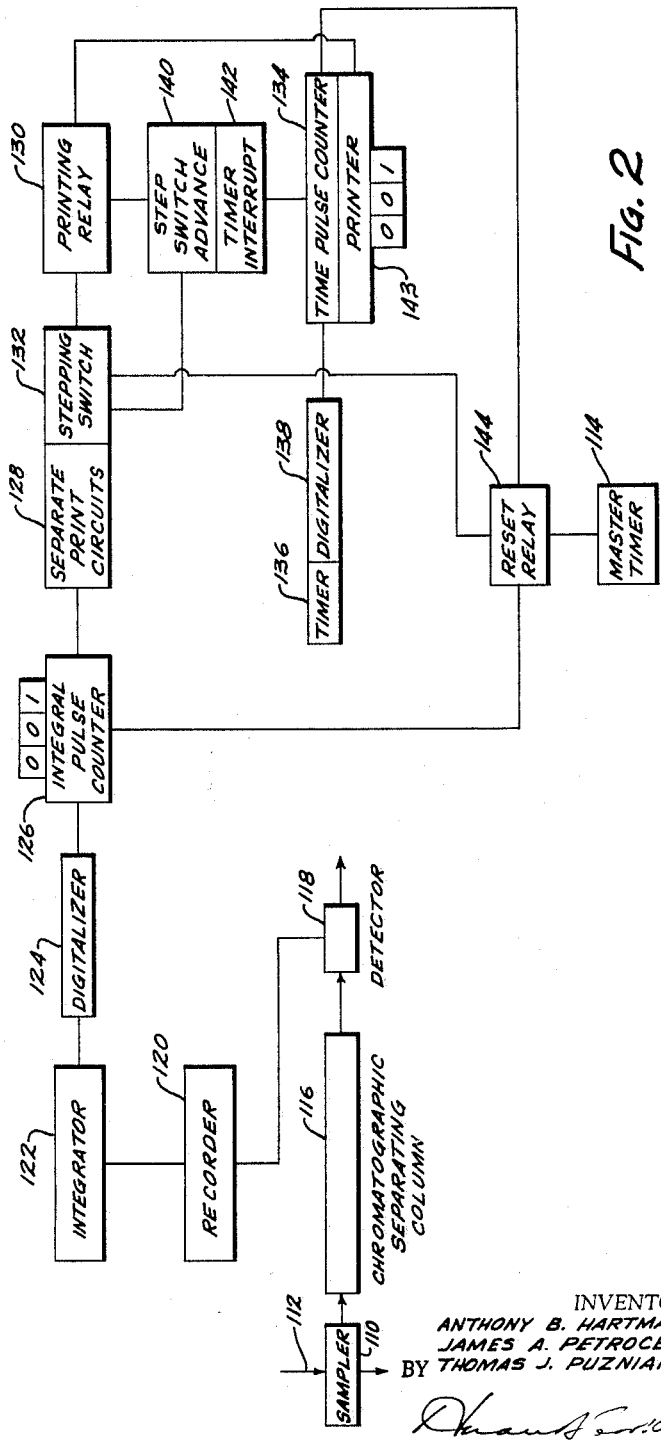

Referring now briefly to the drawings, there is shown in FIGURE 1 one form in which the distillation data of the automatic analytical apparatus of the aforementioned copending application has been obtainable. The sharply peaked curve of FIGURE 1 corresponds to the differential change in recorder response or detector signal strength with respect to time expressed as units of chart travel, and is also indicative of the differential change in the effluent from a chromatographic separating column with respect to column retention time. The smooth curve shown in the upper portion of the figure corresponds to the integral of the aforesaid differential. The lowermost curve corresponds to integrator counts. The ratio of the number of these counts at any point along the curve to the total number of counts is indicative of the proportion of the sample undergoing separation that has emerged from the column up to that point. FIGURE 2 is a block diagram indicating schematically the major components of one automatic analytical and recording system embodying the present invention. FIGURE 3 is a simplified wiring diagram illustrating the manner of functioning of a preferred embodiment of the herein disclosed automatic recording system.

The present invention can be understood most readily with particular reference to the drawings. Accordingly, referring now to FIGURE 2 in more detail, sampling means 110 is caused to withdraw fluid mixture samples from line 112 at predetermined times controlled by master timer or sequence controller 114 through a linkage, not shown. These samples are injected by sampler 110 into a programmed-temperature chromatographic separating column 116. The particular type of separating column employed forms no part of this invention and therefore need not be described in detail. Nevertheless, for purposes of a complete disclosure it may be stated that any of the separating columns and packings described in detail in the aforesaid copending application can be used in the overall combination apparatus disclosed herein.

The effluent from the chromatographic separation column 116 passes therefrom into detector 118. As in the case of the analytical apparatus disclosed in the aforesaid copending application, there can be used any suitable detecting device that is capable of utilizing some property of the detected component to create an output proportional to its concentration. Excellent results are obtainable with conventional thermal conductivity detecting cells capable of yielding an electrical output proportional to the concentration of the detected component, but other detectors, including gas density balances, radiological ionization and flame temperature detectors, can be used.

The output of the detector 118 is fed into recorder 120 which converts said output in conventional manner, for example, as indicated in U.S. Patent No. 2,998,291, to a mechanical output. This output, translated into the form of angular shaft displacement, can be recorded on a moving chart driven by a constant speed motor (timer), by means of a recording pen associated with a travelling nut that is threaded onto said shaft. The thus-recorded information is in terms of differential change in detector signal strength, which corresponds to differential change in the composition of the effluent, with respect to units of recording chart travel, which corresponds to column retention time.

The output of the recorder 120 in the form of shaft rotations is converted to a second output by a conventional integrating device 122, for example, such as the mechanical ball and disc integrator shown in U.S. Patent No. 2,998,291. The mechanical output of the integrator, in terms of angular shaft displacement, can also be recorded on the recording chart by means of a recording pen associated with a travelling nut threaded onto the integrator output shaft. The thus-recorded information is in terms of integral change in detector signal strength, which corresponds to percent yield, with respect to units of recording chart travel, which corresponds to column retention time. The recorder 120 and the integrator 122 form means furnishing an output that is a function of an integral change with respect to a variable such as time.

The output of integrator 122, in the form of angular shaft displacement, is next converted to a digital electrical output by conventional digitalizing means 124, such as a rotary cam and switch. The digitalizing means 124, together with recorder 120 and integrator 122, form primary means furnishing a primary digitalized output that is a function of a first variable, e.g., an integral change with respect to time.

The digitalized integral output pulses from digitalizer 124 are fed into a conventional device 126 for accumulating or counting the same. Device 126 forms the integral pulse counting means of this invention. When a predetermined number of integral output pulses has been reached, one electrical circuit means of a sequence of such circuits 128, each closable at a different, predetermined integral output pulse count, is closed, thus energizing an actuating means or printing relay 130 forming a part of the circuit. The particular circuit in the sequence 128 utilized to actuate the printing relay 130 is controlled by stepping switch 132.

Energizing of printing relay 130 by closing of one of the circuits 128 causes printing by printer 143 of the number of digitalized time pulses accumulated up to that time by time pulse counting means 134, which is operatively associated with the printing means 143. The time pulses referred to are obtained from a timer 136, such as a constant speed motor, whose output is related to column retention time, after digitalizing such output in conventional manner, as by a rotary switch means 138 or an equivalent thereof. Means 136, with means 138, forms secondary means furnishing a secondary digitalized output that is a function of a second variable, e.g., time.

In addition to the printing action described above caused by energizing printing relay 130, stepping switch 132 is also caused to advance the circuit in group 128 to the next circuit in the sequence by a step switch advance or relay 140, which is also energized by a circuit closable by printing relay 130.

Timer-interrupt switch 142 is also actuated, i.e., opened, by printing relay 130, whereby the pulse counting circuit of time pulse counter 134 is interrupted. In this manner, the counter is prevented from moving during the instant of printing by printer 143.

At the conclusion of the automatic analysis cycle, master timer 114 closes a circuit including reset relay means 144, which in turn closes secondary circuits not shown, including secondary reset relays not shown, that cause resetting of the integral pulse counter 126 and time pulse counter 134 to zero, and advancement of stepping switch 132 to the first circuit in the series 128. Master timer 114 also resets recorder 120 and integrator 122 through means not shown, and initiates a new analytical cycle by actuating sampling means 110, through means not shown.

Referring now in detail to the wiring diagram of FIGURE 3, numeral 8a indicates a D.C. power supply for a portion of the illustrated system. Numbers 1 and 3 refer to a pair of power supply lead wires connected to an A.C. power source. These leads are connected through leads 2 and 6 and 4 and 7, and through voltage divider 5, for reducing the magnitude of the power supply, to a rectifier 8, for converting the A.C. power to D.C.

Numeral 30 denotes a mechanical integrator whose continuous output, in terms of angular displacement of a rotatable shaft, is transmitted to the illustrated device through means for digitalizing such output, such means including a roto-switch comprising cam 30a and cam-actuated switch 18 closable by said cam. Each closing of switch 18 closes an integral pulse counting circuit including leads 19, 20, 21, 22, 23, power supply 8a, leads 10, 11 and 12, integral pulse counting relay 13, and leads 14, 15 and 16.

Numeral 29 denotes integral pulse counting means for counting the digitalized integral pulses from integrator 30. Means 29, as illustrated, includes two rotary switches, each having ten contact points, one for each digit from 1 to 10. The right-hand rotary switch of means 29 accumulates integral pulse counts at the units level and the left-hand switch accumulates such counts at the tens level. The device is so constructed that the tens counter arm 38 moves one contact point for each ten contact points moved by the units counter arm 24. It will be understood that as a practical matter it will normally be preferable to provide for a much larger number of counts than shown in the drawing, which has been simplified for purposes of illustration. Satisfactory results have been obtained by the use of a counting means adapted to accumulate pulses to the ten thousands order of magnitude. In such instances, each rotary switch for each higher order of magnitude bears the same relation to the rotary switch of the next lower order of magnitude, and the other parts of the system, as that borne by the tens switch to the units switch.

Numerals 26 and 40 denote a pair of circuit boards, one for each rotary switch of the integral pulse counter 29, and containing a plurality of possible circuits—one for each combination of digits possible on the rotary switches of integral pulse counter 29—for energizing printing relay 33. Each contact point of the units rotary switch is connected through a separate, insulated lead in ten-wire cable 25 to the correspondingly numbered contact point on the right-hand side of circuit board 26. The same is also true for the tens rotary switch, ten-wire cable 39, and circuit board 40. The only circuits closed by movement of switch arms 38 and 24, and consequently, the only circuits capable of energizing printing relay 33, are those including jumper wires, exemplified by elements 26a and 40a.

Numeral 28 indicates a rotary stepping switch means for connecting each of the circuits provided for in circuit boards 26 and 40 in predetermined sequence. Means 28 includes two rotary step switches, one for each rotary switch of integral pulse counter 29 and one for each corresponding circuit board. Switch arms 42 and 35 are linked mechanically by means 64 so that the arms advance concurrently to the next succeeding contact points. The ten contact points of the right-hand step switch represent a sequence including ten possible circuits for actuating printing relay 33. Each of the ten contact points of the right-hand rotary step switch is connected through a separate, insulated wire in ten-wire cable 27 to the correspondingly numbered contact point on the left-hand side of circuit board 26. The same is also true of the contact points of the left-hand stepping switch, ten-wire cable 41 and circuit board 40.

With the first digitalized integral pulse to integral pulse counter relay 13, the relay is energized causing rotary switch arm 24 to move, through a mechanical linkage, not shown, to contact point 1, thereby closing the first of two circuits provided for in the drawing for actuating printing relay 33 and printing means 32 as described hereinafter. The first of these circuits includes the first contact point of the units integral pulse counter switch, the appropriate wire in ten-wire cable 25, the first terminal of circuit board 26, jumper wire 26a, the first terminal on the left-hand side of circuit board 26, the appropriate wire in ten-wire cable 27, the first contact point of the right-hand switch of stepping switch 28, switch arm 35, leads 36 and 37, switch arm 38, the zero contact point of the tens integral pulse counter switch, the appropriate wire in ten-wire cable 39, the zero terminal of circuit board 40, jumper wire 40a, the first terminal on the left-hand side of circuit board 40, the appropriate wire in ten-wire cable 41, the first contact point of the left-hand step switch, switch arm 42, leads 43, 44, 45 and 46, printing relay 33, leads 47, 48, 22 and 23, power source 8a, leads 10, 11 and 70.

The advancement of switch arm 24 of the integral pulse counter 29 to the second through the ninth contact point opens the printing relay circuit, thus preventing print-out by means 32. Advancement of switch arm 24 to the zero contact point, accompanied by advancement of switch arm 38 to the first contact of the tens integral pulse counter switch and advancement of switch arms 35 and 42 to the second contact points, closes the printing relay circuit again, through the appropriate circuits and jumper wires of the circuit boards, thus again actuating relay 33 and printing means 32.

Printing means 32 includes a secondary printing relay 54 for actuating a printing mechanism, not shown, so as to record on a strip of paper or other recording medium a number corresponding to the number of digitalized time pulses received by counting relay 71. Printing means 32 also includes a secondary reset relay 92 for resetting the time pulse counting means, not shown, actuated by time pulse counting relay 71, to zero at the beginning of each analytical cycle.

With the closing of printing relay 33, the armature 49 closes switch 50, thereby closing a printing circuit including leads 56 and 55, an external power source, not numbered, secondary printing relay 54, and leads 53, 52, and 51. Printing relay armature 49 also closes rotary advance switch 57, which is adapted to close a circuit causing advancement of the arms 35 and 42 of the rotary step switch 28 to the second contact points. The step switch advance circuit includes switch 57, leads 58, 59, 10, power supply 8a, leads 23, 22, 21, 62, rotary step switch advance relay 61 and lead 60. The rotary step switch 28 is so designed that energizing of relay 61 cocks the switch arms 42 and 35. When the printing relay circuit is opened, armature 49 returns to its original position, thus opening rotary advance switch 57 and deenergizing rotary step switch relay 61. With the deenergizing of relay 61, the arms 35 and 42, previously cocked, advance to the second contact points.

The energizing of printing relay 33 and the consequent movement of armature 49 also opens timer-interrupt switch 65, thus opening a time pulse electrical circuit carrying digitalized time pulses to the counting relay 71 of printing-counter means 32. This time pulse circuit includes timer-interrupt switch 65, leads 66 and 67, switch 68, lead 69, an external power source, not numbered, lead 70, time pulse counting relay 71 and lead 72. The opening of the time pulse circuit during printing prevents advance of any of the digits being printing during the printing cycle. De-energizing of printing relay 33 restores armature 49 to its original position, thereby deactuating the secondary printing relay 54 and again closing timer-interrupt switch 65 and again closing the timer pulse circuit, whereby digitalized time pulses are again delivered to counting relay 71 of printer-counter 32.

Energizing of printing relay 33 and the resultant movement of armature 49 causes movement of time delay switch 107 to its alternate position. The resetting of time delay switch 107 closes an auxiliary printing relay circuit including leads 73 and 46, printing relay 33, leads 47 and 48, lead 22, charged condenser 109 and lead 108. The purpose of this auxiliary circuit is to maintain printing relay 33 actuated for a period sufficiently long for printing to occur, regardless whether the main printing relay circuit, previously described, is caused to open by further advancement of integral pulse counter switch arm 24. Condenser 109 acquires its charge while switch 107 is in its normal position through a circuit including power source 8a, leads 23 and 22, lead 108, switch 107, and leads 106, 70, 11 and 10.

Timer 31 includes a constant speed motor 31a connected to a rotary cam 31b through a mechanical linkage 31c. Cam 31b closes switch 68 with each revolution, thereby digitalizing the output of timer motor 31a. Although as here explained, the number printed by printer 32 is simply a number proportional to time, that is, column retention time, and therefore must be correlated with boiling point by means of a predetermined correlation, it will be appreciated that the number printed by printer 32 can correspond directly to the actual boiling point. This can be achieved in any suitable way, for example, by the use of a motor in place of motor 31a whose speed can be adjusted at the outset to correlate retention time with temperature, or alternatively, the desired correlation is preferably obtained by the use of a suitable power transmission means at 31c, for example, the cylinder, ball and disc transmission utilized in a ball and disc integrator such as that shown in U.S. Patent No. 2,998,291, and by adjustment of such power transmission so that the time pulses transmitted through the time pulse circuit to the counter relay 71 of the printer-counter 32 will be equivalent numerically to temperature pulses.

At the conclusion of a complete analytical cycle, integral pulse counter 29, the time pulse counter of printer-counter 32 are reset to zero, and the rotary step switch arms 35 and 42 are reset to the first contact points of the stepping switch. The reset cycle is initiated by a rotary cam 74 connected with the master timer (not shown) that controls the analytical cycle. Cam 74 actuates armature 75, thus closing reset switch 76. The reset cycle can also be initiated manually by manual switch 76a. Closing of either switch 76 or 76a closes an integral pulse counter reset circuit including leads 1, 77, 78, 79, 80, integral pulse counter reset relay 81, leads 82, 83, 84, 85, 86 and 3. Actuation of relay 81 resets integral pulse counter switch arms 24 and 38 to zero, through a mechanical linkage, not shown.

Closing of switches 76 or 76a also closes a primary reset circuit, including leads 1, 77, 77a, primary reset relay 34, leads 34a and 3. Actuation of relay 34 causes armature 96 to move, thus closing switches 87 and 97. Closing of switch 87 closes a time pulse counter reset circuit, including leads 88, 89, 90, 91, a power source, not numbered, time pulse counter reset relay 92, leads 93, 94 and 95. Energizing of relay 92 causes the digits of the time pulse counter to reset to zero, through a mechanical linkage, not shown.

Closing of step switch advance reset switch 97 closes a step switch advance reset circuit, including switch 97, leads 99 and 100, switch 101, lead 102, switch 103, lead 104, step switch advance relay 61, leads 62, 21, 22, 23, power supply 8a, leads 10, 59 and 98. Energizing of relay 61 causes the advance mechanism associated with switch arms 35 and 42 to cock as a result of the motion of armature 63. Actuation of armature 105, caused by energizing of relay 61, opens switch 103 thus de-energizing relay 61, whereby the switch arms 35 and 42 advance to the next succeeding position. When relay 61 becomes de-energized, armature 105 is restored to its original position, thus closing switch 103 and de-energizing relay 61 and cocking the switch arm advancing mechanism for the next advance. De-energizing relay 61 again opens switch 103, causing the arms 35 and 42 to advance. This sequence continues until the arms 35 and 42 return to the cocked position before the first switch contact in the series. At this point, armature 35a repositions switch 101, thus de-energizing relay 61 and permitting advance of switch arms 35 and 42 to the first position. Repositioning of switch 101 also closes a reset printing circuit including leads 101a, 73 and 46, printing relay 33, leads 47, 48, 22 and 23, power source 8a, leads 10, 59, 98, switch 97, leads 99 and 100. Energizing of the printing relay 33 energizes secondary printing relay 54, which causes the printing mechanism to print the number of time pulses on the counter of printer-counter 32, as previously described, this number now being zero (or the temperature equivalent thereof), thus signifying commencement of a new analytical cycle.

When the first print-out of the new analytical cycle is complete, reset relay 34 is de-energized by switch 76, which is opened by rotary cam 74. The time of the reset cycle, that is, the time which reset relay 34 remains energized, is controlled by the shape of rotary cam 74.

In a specific embodiment, with reference to FIGURE 2 of the drawings, the sampler 110, column 116, and thermal conductivity detector 118 are those described specifically in copending application Serial No. 178,012. The recorder 120 is a Model 143 Honeywell Recorder; the integrator 122 is a mechanical type, Model 201 Disc Integrator. The integral pulse counter 126 is a Model 7005 D48A3 Neuron Counter capable of recording integral pulse counts of the order of magnitude of tens of thousands; the stepping switch 132 is a PW–106105–GJAB Automatic Electric Switch; and the printer-counter 132, 134 is a Series 1500, Standard Speed, Add Only, Baranoff Printer. Printing circuits are provided for on a total of five circuit boards (one for each of the five orders of magnitude of integral pulse counts) for printing of the appropriate total timer pulses after preselected proportions, for example, 5%, 10%, 20%, 50%, 90% and 95%, of the total integrator pulse counts in one analytical cycle have been reached.

Numerous other modifications and embodiments of the invention will suggest themselves readily to those skilled in the art. Accordingly, we do not wish the scope of the invention to be limited by the embodiments disclosed herein but only by the scope of the claims appended hereto.

It will be understood that the invention is not limited to the particular embodiments disclosed and that good results can also be obtained by other equivalent apparatus. Thus, the invention is not limited to the use of chromatographic analytical apparatus, as other apparatus can be used. Thus, conventional ASTM distillation apparatus can be used as the source of integral output pulses. Similarly, the invention is not limited to recording of a number that is a function of time pulses counted, when predetermined integral pulse counts have been attained; rather the invention can be used to record numbers that are a function of any counting variable, for example, temperature, pressure, time, distance, when a predetermined count has been reached with respect to any other counting variable, including those just listed.

We claim:

1. Apparatus for automatically recording values that are a function of one variable at predetermined values that are a function of another variable, comprising a primary means furnishing a primary digitalized output that is a function of a first variable, primary pulse counting means actuated by said primary means for counting the primary digitalized output pulses, secondary means furnishing a secondary digitalized output that is a function of a second variable, secondary pulse counting means actuated by said secondary means for counting said secondary digitalized output pulses, printing means associated with said secondary pulse counting means for printing a number that is a function of said second variable, actuating means, actuated by said primary pulse counting means when a predetermined number of primary digitalized output pulses has been reached, for actuating said printing means.

2. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, timing means having a digital output, time pulse counting means actuated by the digitalized timing means output for counting digitalized time output pulses, printing means associated with said time pulse counting means for printing a number that is a function of the number of time pulses counted, actuating means, actuated by said integral pulse counting means when a predetermined integral pulse count is reached, for actuating said printing means.

3. The apparatus of claim 2 including additionally means actuated by said integral pulse counting means for interrupting operation of said time pulse counting means concurrently with actuation of said printing means.

4. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, timing means having a digital output, time pulse counting means actuated by the digitalized timing means output for counting digitalized time output pulses, printing means, actuated by said relay and associated with said time pulse counting means, for printing a number that is a function of the number of time pulses counted.

5. The apparatus of claim 4 including additionally electrical means associated with said relay for maintaining the same energized for a period of time sufficient for completion of the printing operation by said printing means independently of any concurrent increase in the integral pulse count.

6. The apparatus of claim 4 including additionally means actuated by said relay for interrupting operation of said time pulse counting means concurrently with actuation of said printing means.

7. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, timing means having a digital output, time pulse counting means actuated by the digitalized timing means output for counting digitalized time output pulses, printing means, actuated by said relay and associated with said time pulse counting means, for printing a number that is a function of the number of time pulses counted, electrical means associated with said relay for maintaining the same energized for a period of time sufficient for completion of the printing operation by said printing means independently of any concurrent increase in the integral pulse count, means actuated by said relay for interrupting operation of said time pulse counting means concurrently with actuation of said printing means.

8. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, a plurality of separate electrical circuits, including a relay energized thereby, each of said circuits being closed by said integral pulse counting means when a predetermined integral pulse count is reached, a stepping switch for connecting each of said separate electrical circuits with said integral pulse counting means in a predetermined sequence, stepping switch advancing means, actuated by said relay, for advancing said stepping switch through each of said electrical circuits in said predetermined sequence, timing means having a digital output, time pulse counting means for counting a digitalized time output pulse, printing means, actuated by said first-mentioned relay and associated with said time pulse counting means, for printing a number that is a function of the number of time pulses counted.

9. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, for actuating a relay, timing means having a digital output, time pulse counting means actuated by the digitalized timing means output for counting digitalized time output pulses, printing means, actuated by said relay and associated with said time pulse counting means for printing a number that is a function of the number of time pulses counted, a reset circuit means actuated by a sequence controlling means, said reset circuit means including a reset relay means energized thereby, for resetting each of said integral pulse counting means and said time pulse counting means to a zero count at a predetermined time.

10. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, a plurality of separate electrical circuits, including a relay energized thereby, each of said electrical circuits being closed by said integral pulse counting means when a predetermined integral pulse count is reached, a stepping switch for connecting each of said separate electrical circuits with said integral pulse counting means in predetermined sequence, stepping switch advancing means, actuated by said relay, for advancing said stepping switch through each of said electrical circuits in predetermined sequence, timing means having a digital output, time pulse counting means actuated by the digitalized timing means output for counting digitalized time output pulses, printing means, actuated by said relay and associated with said time pulse counting means, for printing a number that is a function of the number of time pulses counted, electrical means associated with said relay for maintaining the same energized for a period of time sufficient for completion of the printing operation by said printing means independently of any concurrent change in the integral pulse count, means also actuated by said relay means for interrupting operation of said time pulse counting means concurrent with actuation of said printing means, a reset circuit means actuated by sequence controlling means, said reset circuit means including reset relay means energized thereby, for resetting each of said integral pulse counting means and said pulse counting means to a zero count at predetermined times, and for advancing said stepping switch to the circuit in said plurality of separate electrical circuits that is first in said predetermined sequence.

11. Chromatographic analytic apparatus and automatic recording means therefor comprising a chromatographic separation column for separating a fluid mixture, detecting means for detecting the separated components of the fluid mixture as they emerge from the separating column, said detecting means having an electrical output that is a function of the composition of the effluent from the separating column, a recorder for converting said electrical output to a mechanical output that is a function of the differential change in the composition of said effluent with respect to retention time in said separation column, means for converting said mechanical output to a second mechanical output that is a function of the integral of said differential, means for converting this integral output into a digital output, integral pulse counting means actuated by said digital output for counting the digitalized integral output pulses, timing means having a digital output, time pulse counting means actuated by said output for counting digitalized time output pulses, printing means associated with said time pulse counting means for printing a number that is a function of the number of time pulses counted, actuating means, actuated by said integral pulse counting means when a predetermined integral pulse count is reached, for actuating said printing means.

12. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, a time pulse electrical circuit including timing means having a digital output, time pulse counting means actuated by the digitalized counting means output for counting digitalized time output pulses, and switch means activated by said relay for opening said time pulse electrical circuit when printing means, hereinafter referred to, is activated, printing means actuated by said relay and associated with said time pulse counting means, for printing a number that is a function of the number of time pulses counted.

13. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, timing means having a digital output, time pulse counting means actuated by the digitalized timing means output for counting digitalized time output pulses, printing means, actuated by said relay and associated with time pulse counting means, for printing a number that is a function of the number of time pulses counted, an auxiliary printing relay circuit actuated by said first mentioned relay, said auxiliary printing relay circuit including electrical condenser means for acquiring a charge and maintaining said first mentioned relay energized for a time after said first mentioned electrical circuit means for energizing said first mentioned relay has been opened by advancement of said integral output pulse counting means.

14. Apparatus for automatically recording values that are a function of one variable at predetermined values that are a function of another variable, comprising means furnishing a digital output that is a function of an integral change with respect to time, integral pulse counting means actuated by said digital output for counting the digitalized integral output pulses, electrical circuit means, including a relay energized thereby, said electrical circuit means being closed by said integral output pulse counting means when a predetermined integral pulse count is reached, a time pulse electrical circuit including timing means having a digital output, time pulse counting means actuated by the digitalized timing means output for counting digitalized time ouput pulses and switch means activated by said relay for opening said time pulse electrical circuit when printing means, hereinafter referred to, is actuated, printing means, actuated by said relay and associated with said time pulse counting means, for printing a number that is a function of the number of time pulses counted, an auxiliary printing relay circuit actuated by said first mentioned relay, said auxiliary printing relay circuit including electrical condenser means for acquiring a charge and maintaining said first mentioned relay energized for a time after said first mentioned electrical circuit means for energizing said first mentioned relay has been opened by advancement of said integral output pulse counting means.

15. Chromatographic analytic apparatus and automatic recording means therefor, comprising a chromatographic separation column for separating a fluid mixture, detecting means for detecting the separated components of the fluid mixture as they emerge from the separating column, said detecting means having an electrical output that is a function of the composition of the effluent from the separating column, a recorder for converting said electrical output to a mechanical output that is a function of the differential change in the composition of said effluent with respect to retention time in said separation column, means for converting said mechanical output to a second mechanical output that is a function of the integral of said differential, means for converting this integral output into a digital output, integral pulse counting means actuated by said digital output for counting the digitalized integral output pulses, electrical circuit means, including a relay energized thereby, said electrical circuit means being closed by said integral output pulse counting means when a predetermined integral pulse count is reached, a time pulse electrical circuit including timing means having a digital output, time pulse counting means actuated by the digitalized timing means output for counting digitalized time output pulses and switch means actuated by said relay for opening said time pulse electrical circuit when printing means, hereinafter referred to, is actuated, printing means associated with said time pulse counting means for printing a number that is a function of the number of time pulses counted, actuating means, actuated by said integral pulse counting means when a predetermined integral pulse count is reached, for actuating said printing means.

16. Chromatographic analytic apparatus and automatic recording means therefor, comprising a chromatographic separation column for separating a fluid mixture, detecting means for detecting the separated components of the fluid mixture as they emerge from the separating column, said detecting means having an electrical output that is a function of the composition of the effluent from the separating column, a recorder for converting said electrical output to a mechanical output that is a function of the differential change in the composition of said effluent with respect to retention time in said separation column, means for converting said mechanical output to a second mechanical output that is a function of the integral of said differential, means for converting this integral output into a digital output, integral pulse counting means actuated by said digital output for counting the digitalized integral output pulses, electrical circuit means, including a relay energized thereby, said electrical circuit means being closed by said integral output pulse counting means when a predetermined integral pulse count is reached, timing means having a digital output, time pulse counting means actuated by said output for counting digitalized time output pulses, printing means associated with said time pulse counting means for printing a number that is a function of the number of time pulses counted, actuating means, actuated by said integral pulse counting means when a predetermined integral pulse count is reached, for actuating said printing means.

17. Chromatographic analytic apparatus and automatic recording means therefor, comprising a chromatographic separation column for separating a fluid mixture, detecting means for detecting the separated components of the fluid mixture as they emerge from the separating column, said detecting means having an electrical output that is a function of the composition of the effluent from the separating column, a recorder for converting said electrical output to a mechanical output that is a function of the differential change in the composition of said effluent with respect to retention time in said separation column, means for converting said mechanical output to a second mechanical output that is a function of the integral of said differential, means for converting this integral output into a digital output, integral pulse counting means actuated by said digital output for counting the digitalized integral output pulses, electrical circuit means, including a relay energized thereby, said electrical circuit means being closed by said integral output pulse counting means when a predetermined integral pulse count is reached, a time pulse electrical circuit including timing means having a digital output, time pulse counting means actuated by the digitalized timing means output for counting digitalized time output pulses and switch means actuated by said relay for opening said time pulse electrical circuit when printing means, hereinafter referred to, is actuated, printing means associated with said time pulse counting means for printing a number that is a function of the number of time pulses counted, actuating means, actuated by said integral pulse counting means when a predetermined integral pulse count is reached, for actuating said printing means, and auxiliary printing relay circuit actuated by said first mentioned relay, said auxiliary printing relay circuit including electrical condenser means for acquiring a charge and maintaining said first mentioned relay energized for a time after said first mentioned electrical circuit means for energizing said first mentioned relay has been opened by advancement of said integral output pulse counting means.

References Cited by the Examiner
UNITED STATES PATENTS

| | | | |
|---|---|---|---|
| 2,549,071 | 4/51 | Dusek et al. | 346—17 |
| 2,825,620 | 3/58 | Sperry et al. | 346—34 |
| 2,963,222 | 12/60 | Allen | 235—151 |
| 2,970,877 | 2/61 | Parsons et al. | 346—34 |
| 2,982,123 | 5/61 | Kindred | 346—34 |
| 3,038,078 | 6/62 | Kern | 250—106 |
| 3,054,288 | 9/62 | Bowman et al. | 346—33 |
| 3,063,631 | 11/62 | Ray | 346—33 |
| 3,099,512 | 7/63 | Kohler | 346—34 |

LEYLAND M. MARTIN, *Primary Examiner.*

LEO SMILOW, *Examiner.*